United States Patent
Wei et al.

(10) Patent No.: US 7,535,738 B2
(45) Date of Patent: May 19, 2009

(54) METHOD AND APPARATUS INCLUDING MULTI-DRIVE CONFIGURATIONS FOR MEDIUM VOLTAGE LOADS

(75) Inventors: Lixiang Wei, Whitefish Bay, WI (US); Gary Leonard Skibinski, Milwaukee, WI (US); Richard A. Lukaszewski, New Berlin, WI (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 331 days.

(21) Appl. No.: 11/508,535

(22) Filed: Aug. 23, 2006

(65) Prior Publication Data

US 2008/0049468 A1   Feb. 28, 2008

(51) Int. Cl.
*H02M 7/48* (2007.01)
*H02J 3/00* (2006.01)

(52) U.S. Cl. .......................... 363/71; 363/34
(58) Field of Classification Search ............. 363/34, 363/71
See application file for complete search history.

(56) References Cited

U.S. PATENT DOCUMENTS

| | | | | |
|---|---|---|---|---|
| 4,204,264 A | * | 5/1980 | Lipman | 363/71 |
| 5,317,498 A | * | 5/1994 | Dhyandchand et al. | 363/43 |
| 5,619,407 A | * | 4/1997 | Hammond | 363/155 |
| 5,657,217 A | * | 8/1997 | Watanabe et al. | 363/71 |
| 6,377,478 B1 | * | 4/2002 | Morishita | 363/34 |
| 6,510,063 B2 | * | 1/2003 | Kobayashi et al. | 363/41 |

OTHER PUBLICATIONS

Makoto Hagiwara, et al, An Approach to Regulating the DC-Link Voltage of a Voltage-Source BTB System During Power Line Faults, IEEE Transactions on Industry Application, vol. 41, No. 5, Sep./Oct. 2006, pp. 1263-1271.
Gary L. Skibinsk et al, Cost Effective Multi-Pulse Transformer Solutions For Harmonic Mitigation in AC Drives, IEEE 2003 Industry Application Society (IAS) conference, 10 pages.
Remus Teodorescu et al, Multilevel Inverter by Cascading Industrial VSI, IEEE Transaction on Industrial Electronics, vol. 49, No. 4, Aug. 2002, pp. 832-838.
E. Cengelci et al, A New Medium-Voltage PWM Inverter Topology for Adjustable-Speed Drives, IEEE Transaction on Industrial Electronics, vol. 35, No. 3, May/Jun. 1999, pp. 628-637.

* cited by examiner

*Primary Examiner*—Jessica Han
*Assistant Examiner*—Emily Pham
(74) *Attorney, Agent, or Firm*—Quarles & Brady LLP; Alexander R. Kuszewski (57) ABSTRACT

A method and apparatus for converting X phase intermediate voltages on X intermediate lines to output voltage for driving a single three phase load, the apparatus comprising a positive DC bus, a negative DC bus and first and second three phase drives that each include a rectifier section and an inverter section, the rectifier sections each linked to a separate three of the X intermediate lines and to the positive and negative DC buses and the inverter linked to each of the positive and negative DC buses and to the single phase load such that each of the drives has a common positive DC bus and a common negative DC bus.

31 Claims, 9 Drawing Sheets

METHOD AND APPARATUS INCLUDING MULTI-DRIVE CONFIGURATIONS FOR MEDIUM VOLTAGE LOADS

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

Different applications require different power and voltage levels and therefore different types of converters that have different power ratings. In general power converters can be divided into three different types, low voltage, medium voltage and high voltage where each of the different converter types includes a rectifier section that converts three phase AC voltage to DC voltage on positive and negative DC buses and across a DC link capacitor and an inverter section that converts the DC voltage on the DC buses to three phase AC voltage on three output lines that feed a three phase load. The difference between the three converter types is typically in the types of devices employed to configure the converters where the power rating and expense associated with components increases as the power rating of the drive increases. Thus, high voltage converters are typically more expensive than medium voltage converters and low voltage converters are less expensive than medium voltage converters.

There are a huge number of different applications that require low voltage converters and fewer applications that require medium and large voltage converters and, for this reason, low voltage converters are manufactured in much greater quantities than the other converter types and economies of scale are achieved such that low voltage converters are relatively inexpensive. In fact, low voltage converter costs are so much less expensive relative to medium and high voltage converters that, in many cases, it is less expensive to cobble together several low voltage converters to serve medium and or high voltage applications.

One simple way to connect low voltage converters to provide a medium or high power rating is to connect a plurality of low voltage converters to form a cascaded H bridge multi-level inverter system where each low voltage single phase H bridge cell is isolated from input power lines using a multiphase transformer and where each single phase of the configuration is operated as a single phase. While this solution has several advantages, this solution also has several shortcomings. First, because each H bridge in this configuration type operates as a single phase, the size of the DC link capacitors required to configure the bridges is much higher than for a three phase converter which increases costs appreciably. Second, each of the three cells has to be controlled simultaneously to balance the power generated by each cell in order to guarantee safe drive operation and to create a high quality input current waveform that meets IEEE 519 requirements related to harmonics. Third, in cases where regeneration is to be supported, many more controlled switches have to be added to the overall system which increased the price of the overall system substantially.

One other solution that has been considered in the conversion industry has been to operate low voltage three phase converters that include input lines that are connected via non-isolated transformers and output lines that are connected via non-isolated transformers. Here, one problem has been that the non-isolated transformers linked to the output lines leave the low voltage drives exposed to high motor terminal voltages that can cause damage to the low voltage drives when certain operational conditions occur.

BRIEF SUMMARY OF THE INVENTION

At least some embodiments include an apparatus for converting X phase intermediate voltages on X intermediate lines to output voltage for driving a single three phase load, the apparatus comprising a positive DC bus, a negative DC bus, a first three phase drive that includes a first three phase rectifier and a first three phase inverter, the first three phase rectifier linked to a first three of the X phase intermediate lines and to each of the positive and negative DC buses, the first three phase inverter linked to each of the positive and negative DC buses and to the single three phase load to provide voltage to the load, the first rectifier receiving three phase intermediate voltages via the first three intermediate lines and converting the intermediate voltages to DC bus voltage across the buses, the first inverter converting at least a portion of the DC bus voltage to AC voltage and providing the AC voltage to the single three phase load and a second three phase drive that includes a second three phase rectifier and a second three phase inverter, the second three phase rectifier linked to a second three of the X phase intermediate lines and to each of the positive and negative DC buses, the second three phase inverter linked to each of the positive and negative DC buses and to the single three phase load to provide voltage to the load, the second rectifier receiving three phase intermediate voltages via the second three intermediate lines and converting the input voltages to DC bus voltage across the buses, the second inverter converting at least a portion of the DC bus voltage to AC voltage and providing the AC voltage to the single three phase load.

Some embodiments further include an isolation transformer between the first and second three phase drives and the single three phase load. Some embodiments further include a (3★Y)-to-3 phase isolation transformer between the first and second three phase drives and the single three phase load wherein Y is at least two. In at least some cases Y is the number of drives in the apparatus.

Some embodiments further include at least a third three phase drive that includes a third three phase rectifier and a third three phase inverter, the third three phase rectifier linked to a third three of the X phase intermediate lines and to each of the positive and negative DC buses, the third three phase inverter linked to each of the positive and negative DC buses and to the single three phase load to provide voltage to the load, the third rectifier receiving three phase intermediate voltages via the third three intermediate lines and converting the input voltages to DC bus voltage across the buses, the third inverter converting at least a portion of the DC bus voltage to AC voltage and providing the AC voltage to the single three phase load.

In at least embodiments cases the transformer is a 9-to-3 phase isolation transformer. In at least some cases the isolation transformer is one of a parallel primary-series secondary transformer and an isolated multiphase transformer. In at least some cases the apparatus is also for converting three phase input voltages on three phase input lines to the X phase intermediate voltages on the X phase intermediate lines, the apparatus further including a 3-to-X phase input transformer between the three phase input lines and the X phase intermediate lines.

In at least some embodiments the input transformer includes an autotransformer. In at least some cases the input transformer includes an isolated multiphase transformer. In at least some embodiments the input transformer includes an isolated auto multiphase transformer. Some embodiments further include an isolation transformer linked between at least the first drive and the single three phase load for converting the first drive output voltages to three phase voltages, the transformer including primary windings linked to the first drive and secondary windings linked to the single three phase load, wherein output lines of at least one of the drives are linked through the secondary windings to the single three phase load.

In at least some cases a controller receives three phase modulating waveforms and uses those waveforms to drive the drives, the controller reducing the waveform magnitudes prior to using the waveforms to control the drives. In at least some cases the controller reduces the waveform magnitudes by dividing each waveform by X/3. In still other cases the controller reduces the waveform magnitudes by different amounts for each of at least a subset of the drives.

In at least some embodiments the load has a rated frequency and wherein a controller receives three phase modulating waveforms and uses those waveforms and an output frequency to generate output waveforms for controlling the drives, the controller providing a first set of output waveforms when the output frequency is below the rated frequency and providing a second set of output waveforms when the output frequency is above the rated frequency.

In at least some embodiments the first set of output wave forms includes three phase waveforms that are identical to the modulating waveforms and that are provided to the first drive and other waveforms that have zero values that are provided to the other drives and wherein the second set of output wave forms include reduced magnitude waveforms.

In addition, some embodiments include a method for converting X phase intermediate voltages on X intermediate lines to output voltage for driving a single three phase load, the method for use with positive and negative DC buses and comprising the steps of providing a first three phase drive that includes a first three phase rectifier and a first three phase inverter, providing a second three phase drive that includes a second three phase rectifier and a second three phase inverter, linking the first three phase rectifier to a first three of the X phase intermediate lines and to each of the positive and negative DC buses, linking the first three phase inverter to each of the positive and negative DC buses and to the single three phase load to provide voltage to the load, linking the second three phase rectifier to a second three of the X phase intermediate lines and to each of the positive and negative DC buses, linking the second three phase inverter to each of the positive and negative DC buses and to the single three phase load to provide voltage to the load, using the first rectifier to convert three phase intermediate voltages received via the first three intermediate lines to DC bus voltage across the buses, using the second rectifier to convert three phase intermediate voltages received via the second three intermediate lines to DC bus voltage across the buses, using the first inverter to convert at least a portion of the DC bus voltage to AC voltage, using the second inverter to convert at least a portion of the DC bus voltage to AC voltage and providing the AC voltage to the single three phase load.

Some embodiments further include providing an isolation transformer between the first and second three phase drives and the single three phase load. In some cases the isolation transformer is one of a parallel primary-series secondary transformer and an isolated multiphase transformer. In at least some cases the method is also for converting three phase input voltages on three phase input lines to the X phase intermediate voltages on the X phase intermediate lines, the method further including providing a 3-to-X phase input transformer between the three phase input lines and the X phase intermediate lines wherein the input transformer includes one of an autotransformer and an isolated multiphase transformer.

Some embodiments further include the step of providing an isolation transformer linked between at least the first drive and the single three phase load for converting the first drive output voltages to three phase voltages, the transformer including primary windings linked to the first drive and secondary windings linked to the single three phase load, wherein output lines of at least one of the drives are linked through the secondary windings to the single three phase load.

In at least some cases the method is also for use with a controller for controlling the drives, the method further including the steps of providing three phase modulating waveforms to the controller and reducing the waveform magnitudes prior to using the waveforms to control the drives. In at least some cases the method is also for use with a controller for controlling the drives and wherein the load has a rated frequency, the method further including the steps of providing three phase modulating waveforms to the controller and using those waveforms and an output frequency to generate a first set of output waveforms when the output frequency is below the rated frequency and to generate a second set of output waveforms when the output frequency is above the rated frequency where the output waveforms are used to control the drives.

In some embodiments the step of generating a first set of output waveforms includes generating a first set of output wave forms including three phase waveforms that are identical to the modulating waveforms and that are provided to the first drive and other waveforms that have zero values that are provided to the other drives and the step of generating a second set of output waveforms includes generating a second set including reduced magnitude waveforms.

Moreover, some embodiments include an apparatus for converting three phase input voltages on three phase input lines to the to output voltage for driving a single three phase load, the apparatus comprising a 3-to-X phase input transformer linked to the three phase input lines and transforming the three phase input voltages to X phase intermediate voltages on X intermediate lines, a positive DC bus, a negative DC bus a first three phase drive that includes a first three phase rectifier and a first three phase inverter, the first three phase rectifier linked to a first three of the X intermediate lines and to each of the positive and negative DC buses, the first three phase inverter linked to each of the positive and negative DC buses and to the single three phase load to provide voltage to the load, the first rectifier receiving three phase intermediate voltages via the first three intermediate lines and converting the intermediate voltages to DC bus voltage across the buses, the first inverter converting at least a portion of the DC bus voltage to AC voltage and providing the AC voltage to the single three phase load, a second three phase drive that includes a second three phase rectifier and a second three phase inverter, the second three phase rectifier linked to a second three of the X phase intermediate lines and to each of the positive and negative DC buses, the second three phase inverter linked to each of the positive and negative DC buses and to the single three phase load to provide voltage to the load, the second rectifier receiving three phase intermediate voltages via the second three intermediate lines and converting the input voltages to DC bus voltage across the buses, the second inverter converting at least a portion of the DC bus voltage to AC voltage and providing the AC voltage to the single three phase load and an isolation transformer linked between the three phase drives and the single three phase load. Here, in some embodiments the input transformer is one of an isolated autotransformer, a non-isolated autotransformer and an isolated 3-to-X phase transformer. To the accomplishment of the foregoing and related ends, the invention, then, comprises the features hereinafter fully described. The following description and the annexed drawings set forth in detail certain illustrative aspects of the invention. However, these aspects are indicative of but a few of the various ways in which the principles of the invention can be employed. Other aspects, advantages and novel features of the invention will become apparent from the following detailed description of the invention when considered in conjunction with the drawings.

DETAILED DESCRIPTION OF THE INVENTION

A. Configurations

Referring now to the drawings wherein like reference numerals correspond to similar elements throughout the several views and, more specifically, referring to FIG. 1, the present invention will be described in the context of an exemplary drive/load system 10 that includes, among other components, a three-phase AC source 12, an input transformer 20, an output transformer 42, a load 46 and a controller 69. Here, source 12 provides three-phase AC power on three input lines collectively identified by numeral 15 to transformer 20. As illustrated, each of lines 15 is characterized by a line inductance (e.g., 14, 16, 18). Transformer 20 and drive configuration 23 are collectively referred to herein as an input-drive subassembly 21. Drive configuration 23 includes first through third separate but linked drives 32, 34 and 36, respectively.

Transformer 20 receives the three-phase AC waveforms on lines 15 and uses those waveforms to generate nine phase intermediate voltage waveforms on nine separate intermediate drive input lines 22, 24 and 26. Here, three of the nine phase waveforms are provided on a first set of intermediate input lines 22 that supply drive 32. Another three of the nine phase waveforms are provided on a second set of intermediate input lines 24 that supply drive 34 and the remaining three of the nine phase waveforms are provided on a third set of intermediate lines 26 that supply drive 36.

Controller 69 controls each of the drives 32, 34 and 36 to generate nine phase output waveforms on nine separate intermediate output lines. As illustrated, three output lines 38 link first drive 32 to output transformer 42, three intermediate output lines 40 link second drive 34 to transformer 42 and the remaining three intermediate output lines 41 link third drive 36 to transformer 42.

Transformer 42 is a nine to three-phase transformer and transforms the waveforms received on lines 38, 40 and 41 into three-phase waveforms on output lines 44 which are linked to and provide power to load 46.

Figure 1:
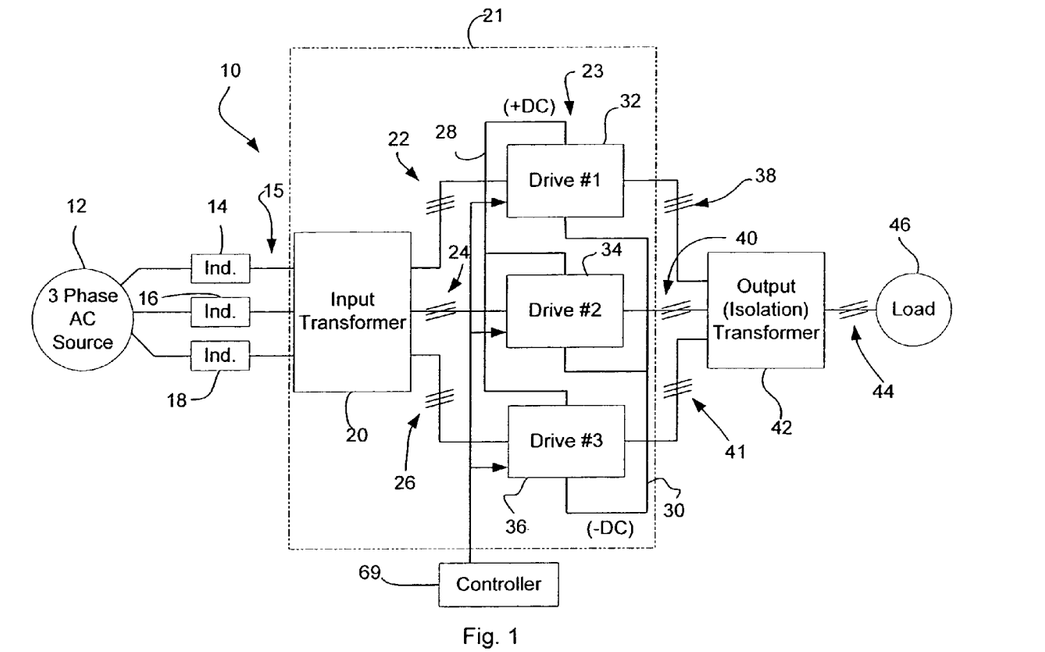
FIG. 1 is a schematic diagram illustrating an exemplary drive/load system according to at least some inventive embodiments.

Referring still to FIG. 1, subassembly 21 also includes a positive DC bus 28 and a negative DC bus 30. Here, positive DC bus 28 for each of the three drives 32, 34 and 36 is a common positive DC bus and, similarly, negative DC bus 30 is common to each of drives 32, 34 and 36. Each of drives 32, 34 and 36 is similarly constructed and operates in a similar fashion and therefore, in the interest of simplifying this explanation, only drive 32 will be described here in detail.

Figure 2:
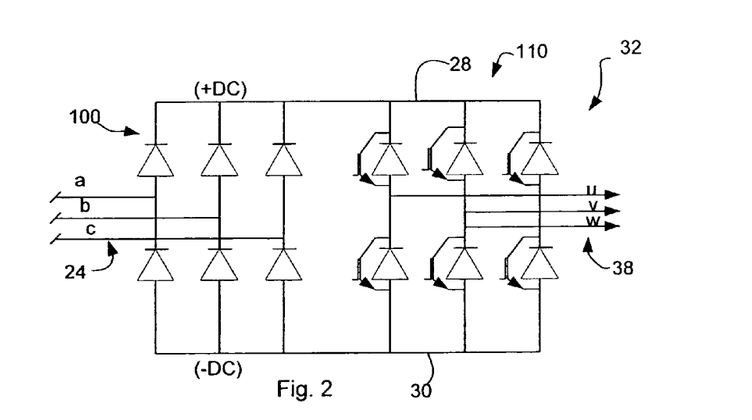
FIG. 2 is a schematic diagram illustrating one of the exemplary drives of FIG. 1.

Referring now to FIG. 2, exemplary drive 32 is a three-phase drive that includes a six device rectifier section 100 and a three-phase and six device inverter section 110 linked thereto. The rectifier section 100 receives three-phase AC power on lines 24 and converts that three-phase power to DC power across the positive and negative DC buses 28 and 30, respectively. Inverter section 110 converts the DC power across the positive and negative buses 28 and 30, respectively, to three-phase AC power on output lines 38. Control and operation of the rectifier 100 and inverter 110 is well known in the motor controls art and therefore will not be described here in detail.

Referring once again to FIG. 1, the invention contemplates many different embodiments where different types of transformers and combinations of input and output transformers are employed along with the common bus multi-drive drive configuration 23. In this regard, referring also to FIG. 3, in at least some inventive embodiments the input transformer 20 includes a nine phase non-isolated autotransformer 20a that receives three-phase power on lines 15 and generates nine phase intermediate voltages on lines 22, 24 and 26 that include three sets of three intermediate voltages. U.S. Pat. No. 6,335,872 titled "Nine-phase Transformer" describes exemplary autotransformers, is incorporated herein in its entirety and should be referred to in this regard. Here, when source 12 is a low voltage source and it is desired to provide a medium voltage output on lines 44, the autotransformer of FIG. 3 can be employed to reduce transformer power ratings.

Figure 4:
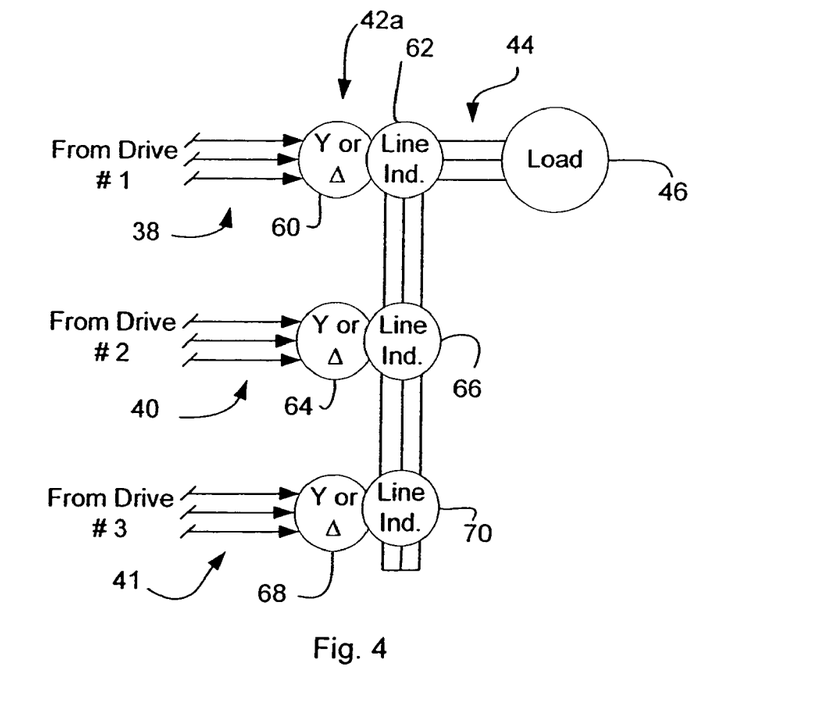
FIG. 4 is a schematic illustrating an exemplary isolation transformer that may be included as part of the FIG. 1 system.

Referring also to FIG. 4, an exemplary output transformer 42a is shown that includes an isolated parallel primary-series secondary transformer that receives three phase output voltages from each of the first, second and third drives 32, 34 and 36 (see again FIG. 1) on lines 38, 40 and 41 and converts those output voltages to three phase output voltages that are delivered to load 46 on lines 44. The primary windings 60 associated with first drive output lines 38 are lined in a Y or Δ configuration. Similarly, the primary windings 64 associated with second drive output lines 40 are linked in either a Y or Δ configuration and the primary windings 68 associated with third drive output lines 41 are linked in either Y or Δ configuration. As the label "parallel primary-series secondary implies, primary windings 60 associated with the first drive 32 (see again FIG. 1) are linked in parallel through the transformer with primary windings 64 and 68 that are associated with the second and third drives 34 and 36 (see FIG. 1).

Figure 3:
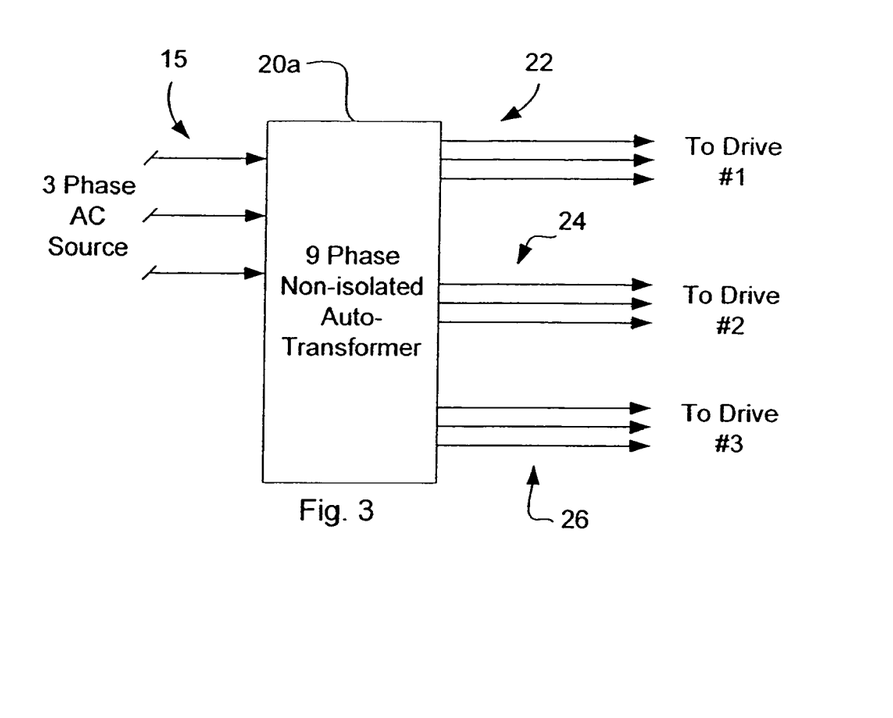
FIG. 3 is a schematic diagram illustrating one exemplary input transformer that may be included in the system of FIG. 1.

Referring still to FIG. 3, as the label "parallel primary-series secondary" implies, secondary windings 62, 66 and 70 associated with each of the primary winding sets 60, 64 and 68 are linked in series. To this end one of the secondary windings associated with primary winding set 68 is linked in series with one of the secondary windings associated with primary winding set 64 and is also linked in series with one of the secondary windings associated with primary winding set 60 which is in turn linked to one of the three phases of load 46, a second of the secondary windings associated with primary winding set 68 is linked in series with a second of the secondary windings associated with primary winding set 64 and is also linked in series with a second of the secondary windings associated with primary winding set 60 which is in turn linked to a second of the three phases of load 46 and a third of the secondary windings associated with primary winding set 68 is linked in series with a third of the secondary windings associated with primary winding set 64 and is also linked in series with a third of the secondary windings associated with primary winding set 60 which is in turn linked to a third of the three phases of load 46.

Figure 5:
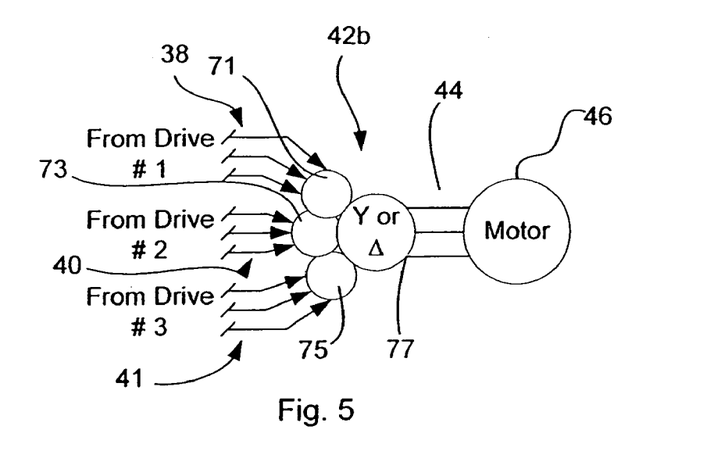
FIG. 5 is a schematic illustrating a second exemplary isolation transformer that may be included as part of the system of FIG. 1.

Referring to FIG. 5, a second exemplary output transformer configuration 42b is illustrated that includes a 9-to-3 phase isolated transformer. Here, as in FIG. 4, transformer 42b receives three phase output voltages from each of the first, second and third drives 32, 34 and 36 (see again FIG. 1) on lines 38, 40 and 41 and converts those output voltages to three phase output voltages that are delivered to load 46 on lines 44. The primary windings 68 associated with first drive output lines 38 are lined in a Y or Δ configuration. Similarly, the primary windings 70 associated with second drive output lines 40 are linked in either a Y or Δ configuration and the primary windings 72 associated with third drive output lines 41 are linked in either Y or Δ configuration. The secondary windings 74 of transformer 42b are arranged in Y or Δ configuration and feed the three phase output lines 44 linked to motor 46.

Figure 6:
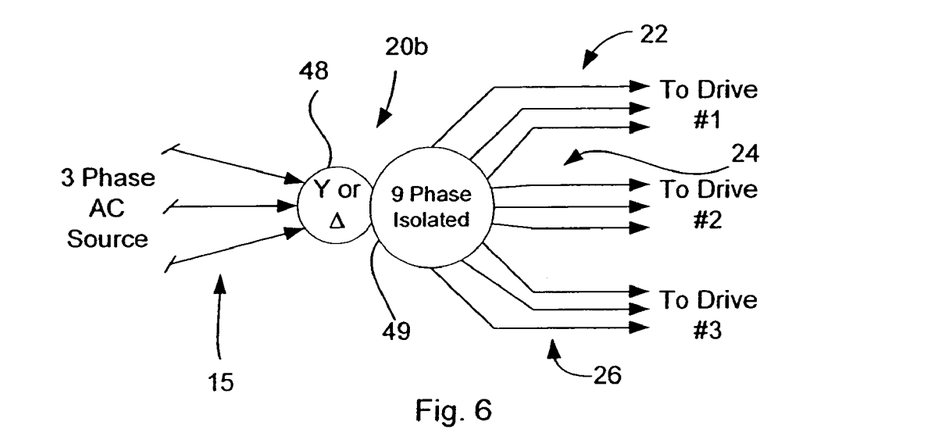
FIG. 6 is a schematic illustrating a second exemplary input transformer that may be included as part of the system of FIG. 1.

Referring to FIG. 6, an exemplary isolated autotransformer 20b that may be used in place of transformer 20 is illustrated (see also FIG. 1). U.S. Pat. No. 6,335,872 titled "Nine-phase Transformer" and incorporated by reference above teaches exemplary isolated autotransformers and should be referred to in this regard. Here, the three AC input lines 15 are linked to Y or Δ wound primary transformer windings 48 and nine phase output lined including first, second and third intermediate line sets 22, 24 and 26 are linked to different nodes of secondary winding 49.

Figure 7:
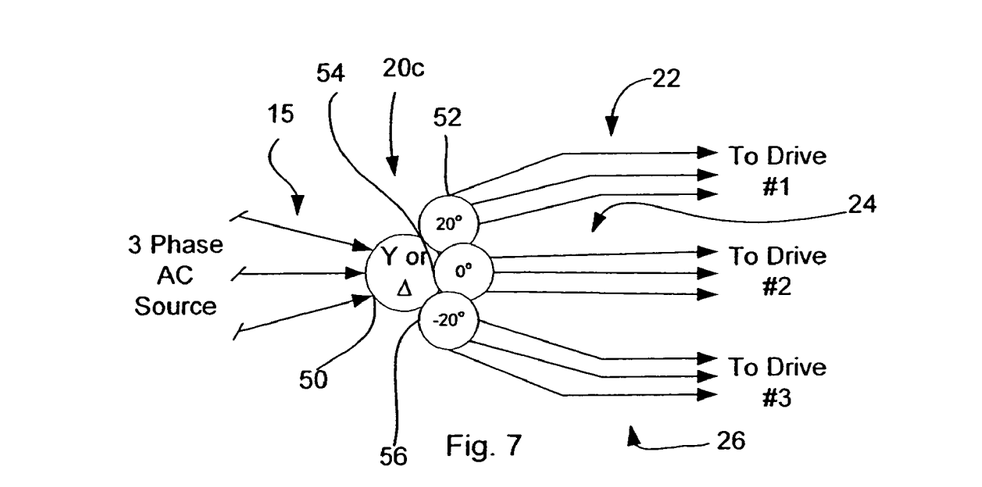
FIG. 7 is a schematic illustrating a third exemplary input transformer that may be used as part of the system of FIG. 1.

Referring to FIG. 7, an exemplary isolated transformer 20c that may be used in place of transformer 20 is illustrated (see also FIG. 1). Here, the three AC input lines 15 are linked to Y or Δ wound primary transformer windings 48. First set of intermediate lines 22 are linked to Y or Δ wound secondary windings 52, second set of intermediate lines 24 are linked to Y or Δ wound secondary windings 54 so as to be phase shifted by 20 degrees from windings 52 and third set of intermediate lines 26 are linked to Y or Δ wound secondary windings 56 so as to be phase shifted by 40 degrees from windings 52.

Referring to FIGS. 1-7 several different embodiments can be configured using the drive and transformer building blocks described above where each configuration has certain advantages and therefore is at least somewhat optimized for specific applications. For instance, where source 12 is a low voltage source and medium voltage output is required at load 26, the non-isolated autotransformer of FIG. 3 can be employed to reduce the power ratings of the configuration and thereby reduce costs. As another instance, when source 12 is a medium voltage source, an isolated autotransformer of isolated transformer as shown in FIGS. 6 and 7, respectively, may be used at the front end (see 20) of the configuration. Where any of the non-isolated autotransformer of FIG. 3, the isolated autotransformer of FIG. 6 or the isolated transformer of FIG. 7 is employed with one of the 9-to-3 phase output transformer or the parallel primary-series secondary transformer as the output transformer 42 (see FIG. 1 again) where the output transformer windings are Y configured, common mode voltages that occur in the drives can be substantially minimized.

Figure 8:
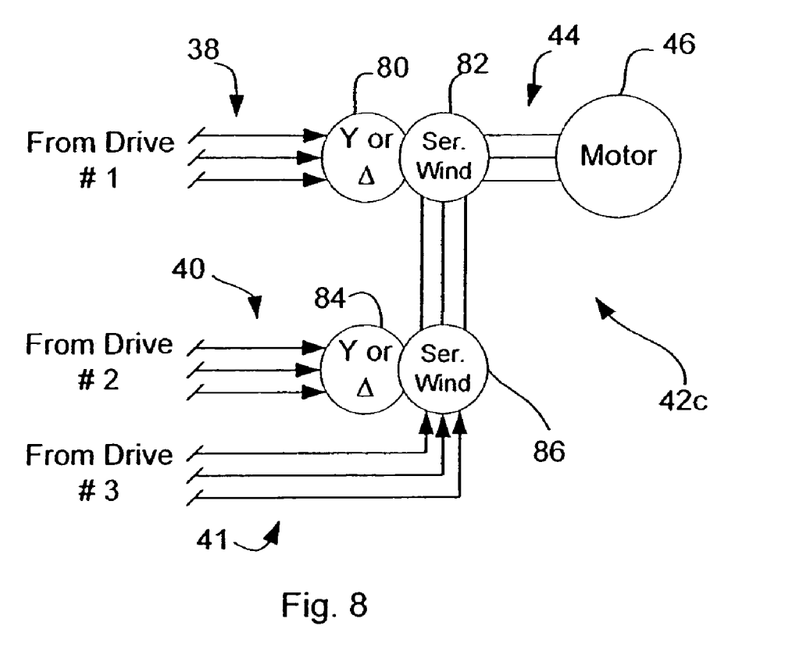
FIG. 8 is a schematic illustrating a third exemplary output transformer that may be used as part of the system of FIG. 1.

Referring still to FIG. 1 and also now to FIG. 8, FIG. 8 includes another exemplary output transformer configuration 42c that may be substituted for the output transformer 42 in FIG. 1. Configuration 42c includes a first Y or Δ connected primary winding assembly 80 linked to drive output line set 38, a second Y or Δ connected primary winding assembly 84 linked to drive output line set 40 and first and second Y or Δ connected secondary winding assemblies 82 and 84 that are associated with primary winding assemblies 80 and 84, respectively, where a first winding in set 86 is in series with a first winding in set 82 and is linked to a first line of the set 41 of lines associated with the third drive, a second winding in set 86 is in series with a second winding in set 82 and is linked to a second line of the set 41 of lines associated with the third drive and a third winding in set 86 is in series with a third winding in set 82 and is linked to a third line of the set 41 of lines associated with the third drive (i.e., the secondary windings in assemblies 82 and 86 are series connected and are linked to third drive output lines 41 so that the third drive is connected directly to the load side).

Figure 9:
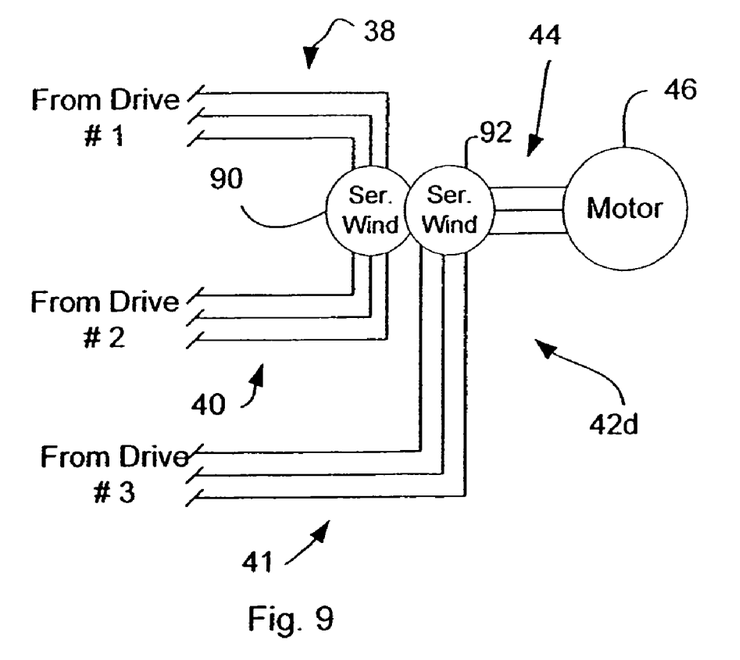
FIG. 9 is a schematic illustrating a fourth exemplary output transformer that may be used as part of the system of FIG. 1.

Referring still to FIG. 1 and also now to FIG. 9, FIG. 9 illustrates another exemplary output transformer configuration 42d that may be substituted for the output transformer 42 in FIG. 1. Configuration 42d includes a single set of three primary windings 90 that are linked between the output lines of drives 32 and 34 (see FIG. 1) and a single set of three secondary windings, a separate one of the secondary windings in series with each of the output lines 44. In FIG. 9 each of the secondary windings 92 is linked between one of the third drive output lines 41 and one of the three phases of the load 46.

Figure 10:
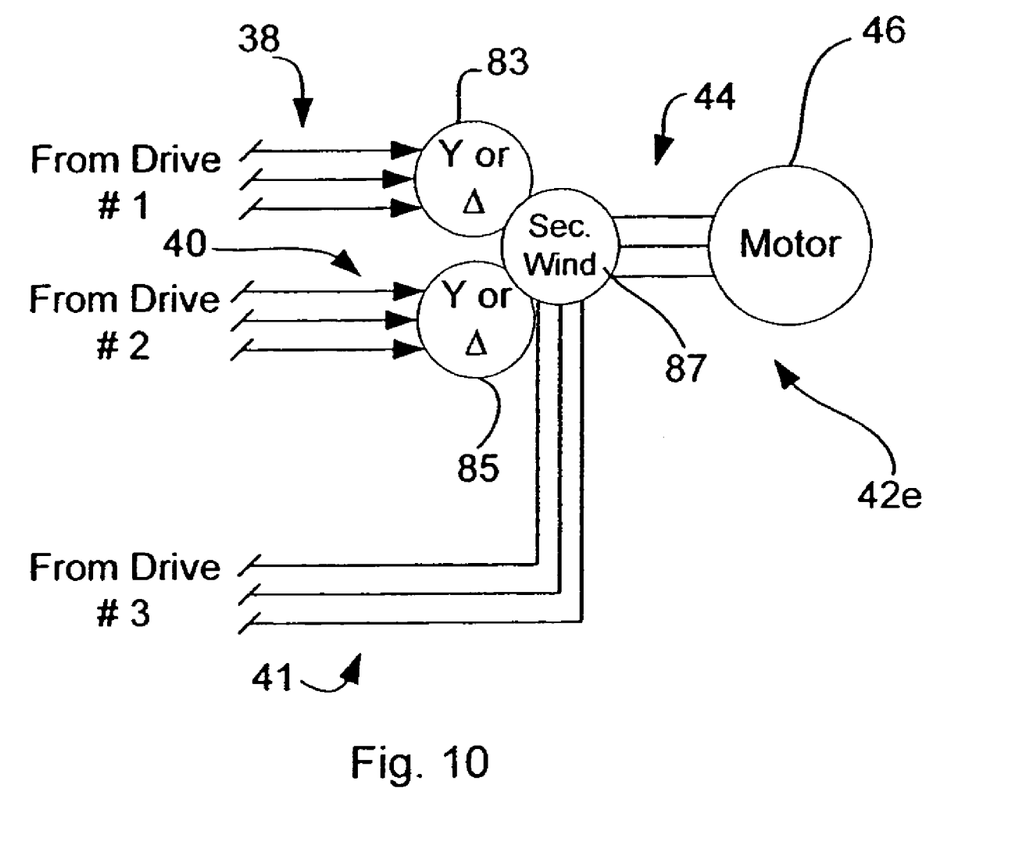
FIG. 10 is a schematic similar to FIG. 9, albeit showing a fifth exemplary output transformer assembly that may be used as part of the system of FIG. 1.

Referring still to FIG. 1 and also now to FIG. 10, FIG. 10 illustrates another exemplary output transformer configuration 42e that may be substituted for the output transformer 42 in FIG. 1. Configuration 42e includes a first Y or Δ connected primary winding assembly 83 linked to drive output line set 38, a second Y or Δ connected primary winding assembly 85 linked to drive output line set 40 and a single set of three secondary windings 87, a separate one of the secondary windings in series with each of the output lines 44 and associated with one of the primary windings from each of the primary winding sets 83 and 85. In FIG. 9 each of the secondary windings 92 is linked between one of the third drive output lines 41 and one of the three phases of the load 46. In FIG. 10 each of the secondary windings in set 87 is linked between one of the third drive output lines 41 and one of the three phases of the load 46.

Configurations 42c, 42d and 42e have two advantages when used in certain applications. First, the FIGS. 8, 9 and 10 configurations can be effectively operated at low speeds and under DC conditions by either not using one or two of the three drives or by driving one or two of the drives differently than the third drive is driven so that the third drive handles all or most of the power conversion task. Second, the FIGS. 8, 9 and 10 configurations can be operated in a manner calculated to reduce overall transformer ratings which means that the specific components selected to configure the drives can have lower ratings and thus can, in general, be less expensive. Exemplary control schemes for reducing power ratings are described hereafter.

In any of the configurations described above and with any combination of the input and output transformers several advantages result. First, for applications that require four quadrant drive operation, the diode front end rectifier section 100 of each drive (see again FIG. 2) can be replaced with an active controlled rectifier module as known in the art.

Second, referring again to FIG. 1, each of the single drives 32, 34 and 36 is a standard low voltage three phase drive. Because low voltage drives of this type are mass produced, economies of scale are realized and therefore the overall costs associated with the illustrated configurations are reduced.

Third, in each contemplated configuration, the input side of each phase is connected to the three phase AC source 12 through some type of multi-phase transformer. Here, where the AC source 12 is low voltage the input transformer (see 20 in FIG. 1) may be a non-isolated autotransformer (see 20a in FIG. 3) and where the AC source 12 is a medium voltage source, input transformer 20 may be either an isolated autotransformer of an isolated transformer (see FIGS. 6 and 7, respectively).

Fourth, each single drive (e.g., each of drives 32, 34 and 36 is FIG. 1) is connected to the other drives in the configuration through common positive and negative DC buses 28 and 30, respectively. Because of this common DC bus, there are no power sharing issues and the input current waveforms on supply lines 15 remain substantially sinusoidal even when output voltages on output line sets 38, 40 and 41 are not balanced (e.g., when the output voltage magnitude on line set 38 is greater than the output voltage magnitudes on line sets 40 and 41).

Fifth, because the drives in any of the configurations are connected through identical transformer windings, any pulse control technique known in the prior art for controlling multilevel drives can be applied to the proposed configurations.

Figure 11:
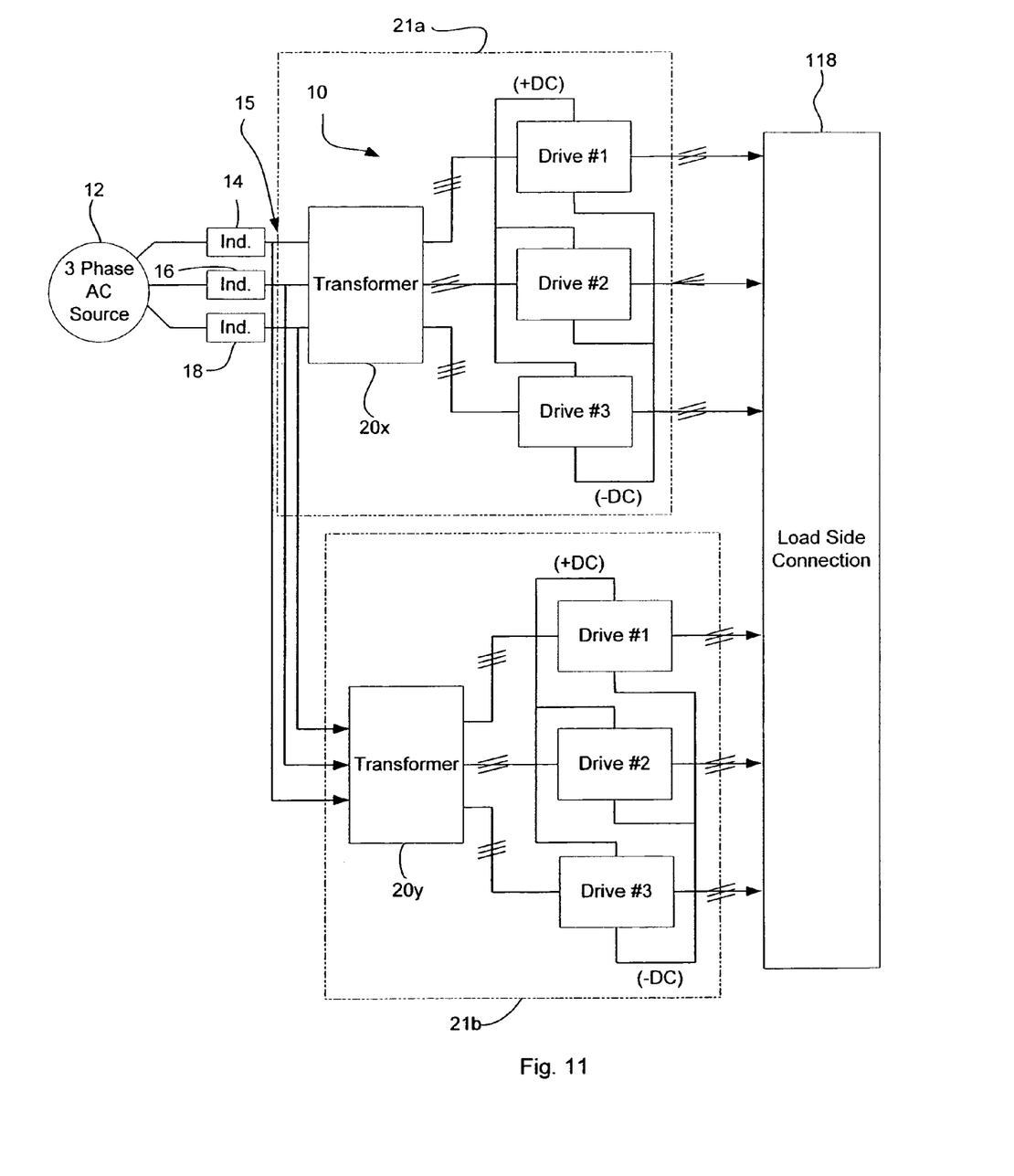
FIG. 11 is a schematic illustrating a system that includes two transformer/drive subassemblies like the subassembly of FIG. 1 that are arranged in a parallel fashion.

Sixth, while configurations including three drives are described above (see drives 32, 34 and 36 in FIG. 1), with the presently contemplated configurations there is no upper limit to the number of drives that can be linked together in a fashion similar to that described above. Thus, there is no upper limit on the power rating for the proposed configuration and therefore a 3-to-6 or 3-to-12 transformer may be used to connect 2 and 4 drives together, respectively. When more than four drives are to be connected, two, three, etc., transformers may be linked together to increase the configuration rating. To this end, see FIG. 11 where two input drive subassemblies 21a and 21b link AC input lines 15 to 18 output lines (not labeled) that feed a load side connection 118 (i.e., some type of isolated output transformer(s) (see again FIGS. 4, 5, 8, 9 and 10) and a load (see motor 46 in FIG. 1)). In FIG. 11 the transformer 20x and 20y may be any one of a non-isolated autotransformer (see FIG. 3), an isolated autotransformer (see FIG. 6) or a 3-to-X isolated transformer (see the 3-to-9 isolated transformer in FIG. 7).

Seventh, when compared to known cascaded H bridge configurations that use low voltage drives to provide medium voltage output to a load, the configurations described above should require far fewer parts and less expensive parts so that overall cost should be appreciably relatively less. To this end, the DC link capacitor 101 (see FIG. 2) should be able to be of a reduced size when compared to known cascaded H-bridge configurations and therefore should be far less expensive and require less space to be accommodated. In addition, the configurations described above should require far fewer diodes and switching devices to configure the rectifier section 100 and the inverter section 110 and therefore cost should be further minimized.

Where configurations include isolation transformers between each of the drives and the load there should not be any isolation problems and therefore the configurations should be relatively easy to implement.

B. Control Strategy

Figure 12:
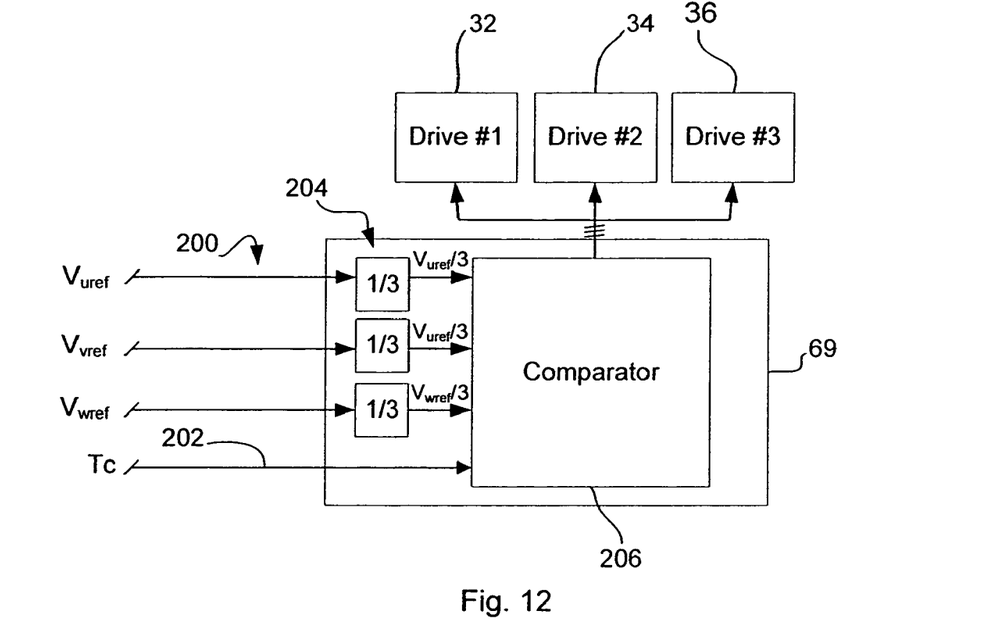
FIG. 12 is a schematic illustrating a first control scheme that is consistent with at least some inventive embodiments.

In at least some applications it has been recognized that it will be advantageous to optimize configuration cost and performance by using a controller 69 (see again FIG. 1) that includes a single control board and by synchronizing pulse width modulation. Referring to FIG. 12, in general, a drive controller 69 receives three phase modulating waveforms Vuref, Vvref and Vwref on lines 200 and a carrier signal Tc on line 202 where each of the modulating waveforms corresponds to a different one of the phases of the three phase load and includes a comparator 206 that compares each of the modulating waveforms to the carrier signal Tc to generate firing pulses to control the switches that comprise the inverter section 110 of a drive (see again FIG. 2). According to one exemplary control scheme, the controller 69 may divide each of the modulating waveforms Vuref, Vvref and Vwref by 3 using multipliers collectively identified by numeral 204 in FIG. 12 prior to the comparison step to reduce the power rating. Thereafter identical three phase firing pulses are provided to each of drives 32, 34 and 36.

Figure 13:
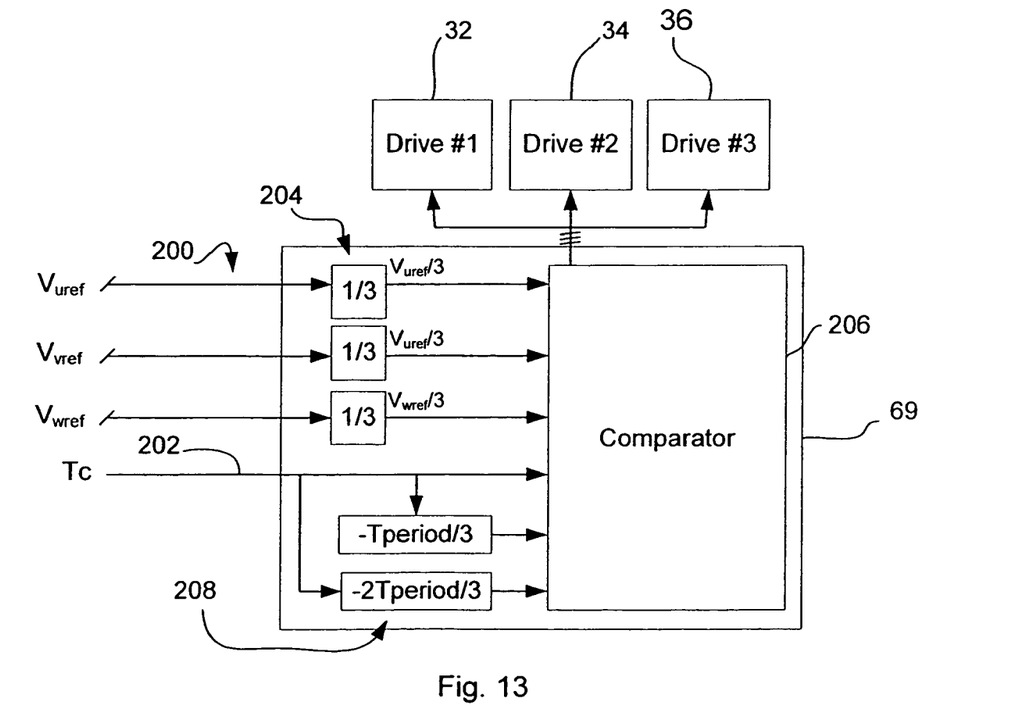
FIG. 13 is a schematic like FIG. 11, albeit illustrating a second control scheme.

Referring to FIG. 13, according to another control scheme, in addition to the components described above with respect to FIG. 12, controller 69 may include two carrier delay blocks collectively identified by numeral 208 that, as the label implies, delay the carrier signal Tc by two different periods prior to the comparison by comparator 206. Here, carrier signal Tc is delayed by one third of the carrier signal period and by two thirds of the carrier signal period by the two delay blocks. After delay, the comparator 206 uses carrier signal Tc to generate firing signals for the first drive 32 and uses the first and second delayed carrier signals to generate firing signals for the second and third drives 34 and 36, respectively. This control scheme tends to reduce harmonics in the resulting output voltages.

Figure 14:
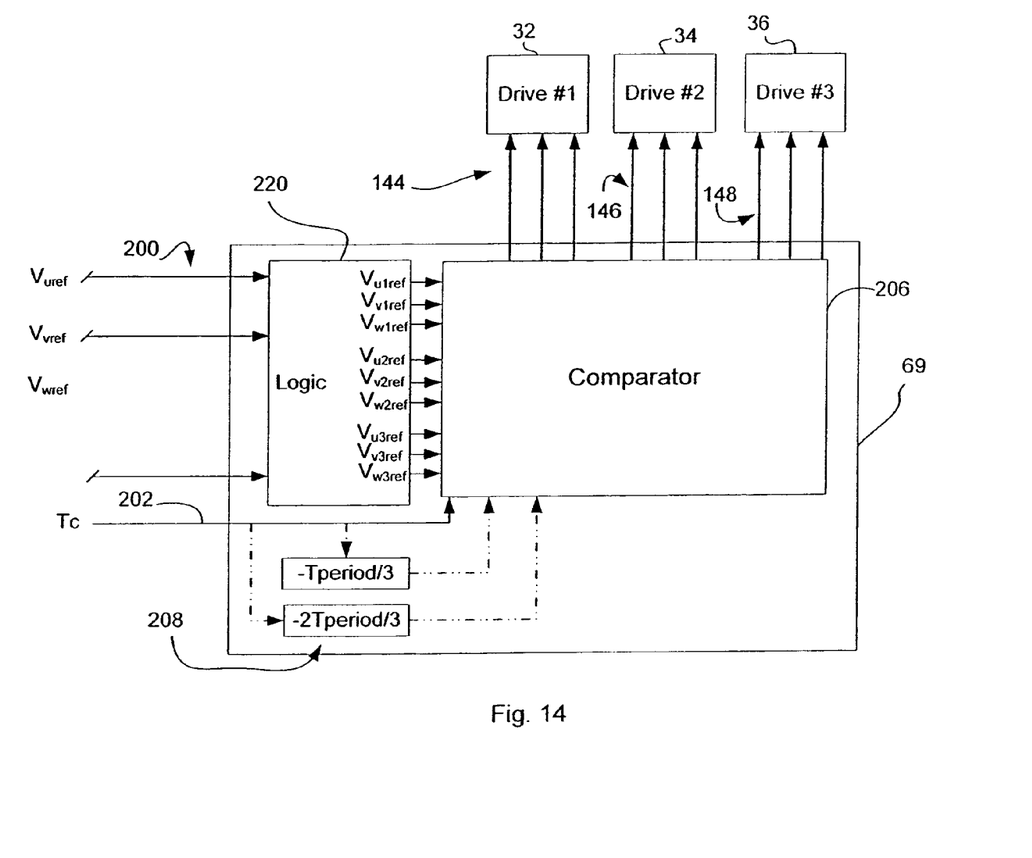
FIG. 14 is similar to FIG. 11, albeit illustrating a third exemplary control scheme.

Referring to FIG. 14, yet another control scheme requires a controller 69 that includes a comparator 206 and logic 220 where the logic 220 receives the three modulating waveforms and generates three different sets of modulating waveforms, a different set for each of the three drives. In the illustrated embodiment the first waveform set includes waveforms Vu1ref, Vv1ref and Vw1ref, the second set includes Vu2ref, Vv2ref and Vw2ref and the third set includes Vu3ref, Vv3ref and Vw3ref. The three waveforms sets are provided to comparator 206 along with the carrier signal Tc which, in at least some embodiments, compares each of the modulating waveforms in each of the sets to the carrier signal and generates first, second and third firing pulse sets on line sets 144, 146 and 148 to control each of drives 32, 34 and 36, respectively. In some cases the carrier signal Tc may be delayed prior to comparison in a fashion similar to that described above with respect to FIG. 13 to reduce harmonics.

Referring still to FIG. 14, how logic 220 alters the input waveforms to generate the three output sets is a matter of designer choice but, in at least some embodiments, may include unevenly dividing the instantaneous magnitude of the input waveform among the output waveforms. For instance, where the input waveform Vuref has an instantaneous value of 1.5, the three U-phase output waveforms may have instantaneous values of 0.8, 0.5 and 0.2 for a total of 1.5. Here, the idea is that some of the drives may be driven at lower power levels than others and therefore could be configured using less expensive components (e.g., switching devices) or could be configured so as not to be isolated from the load (see, for instance, FIGS. 8, 9 and 10 above). Other logic effects are contemplated and indeed, in some cases, the ratios of output waveform values may change as a function of load frequency, modulating waveform magnitude, etc.

Figure 15:
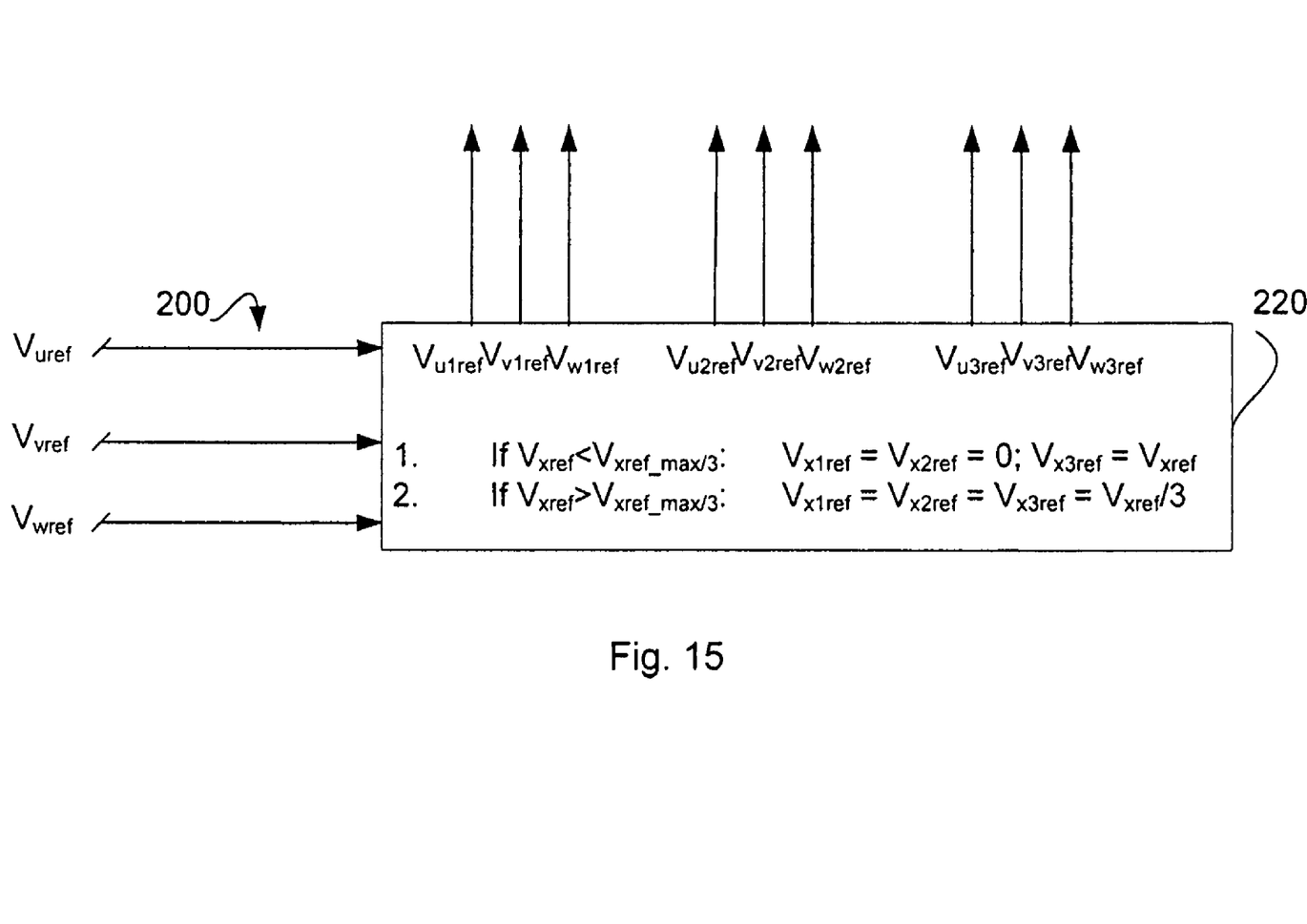
FIG. 15 is similar to FIG. 11, albeit illustrating a fourth exemplary control scheme.

Referring to FIG. 15, an exemplary logic block 220 that may be used to control the values of the modulating waveform sets is illustrated where modulating waveform values depend on the output frequency f of the configuration. As shown, when the output frequency f is less that one third of the rated load frequency (i.e., the rated frequency of a motor linked at load 46), the modulating waveforms associated with first and second drives 32 and 34 are set to zero values and the modulating waveforms associated with the third drive 36 are set equal to the input modulating waveforms Vuref, Vvref and Vwref. Thus, at low voltages only one of the drives (e.g., drive 36) is employed. At voltages above one third the rated voltage of the load, each of the modulating waveforms in the output sets is set equal to one third of the associated input waveform.

One or more specific embodiments of the present invention have been described above. It should be appreciated that in the development of any such actual implementation, as in any engineering or design project, numerous implementation-specific decisions must be made to achieve the developers' specific goals, such as compliance with system-related and business related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Thus, the invention is to cover all modifications, equivalents, and alternatives falling within the spirit and scope of the invention as defined by the following appended claims. To apprise the public of the scope of this invention, the following claims are made:

What is claimed is:

1. An apparatus for converting X phase intermediate voltages on X intermediate lines to output voltage for driving a single three phase load where X is a multiple of three, the apparatus comprising:
   a positive DC bus;
   a negative DC bus;
   a first three phase drive that includes a first three phase rectifier and a first three phase inverter, the first three phase rectifier linked to a first three of the X phase intermediate lines and to each of the positive and negative DC buses, the first three phase inverter linked to each of the positive and negative DC buses and to the single three phase load to provide voltage to the load, the first rectifier receiving three phase intermediate voltages via the first three intermediate lines and converting the intermediate voltages to DC bus voltage across the buses, the first inverter converting at least a portion of the DC bus voltage to AC voltage and providing the AC voltage to the single three phase load; and
   a second three phase drive that includes a second three phase rectifier and a second three phase inverter, the second three phase rectifier linked to a second three of the X phase intermediate lines and to each of the positive and negative DC buses, the second three phase inverter linked to each of the positive and negative DC buses and to the single three phase load to provide voltage to the load, the second rectifier receiving three phase intermediate voltages via the second three intermediate lines and converting the input voltages to DC bus voltage across the buses, the second inverter converting at least a portion of the DC bus voltage to AC voltage and providing the AC voltage to the single three phase load;
   wherein a controller receives three phase modulating waveforms and uses those waveforms to drive the drives, the controller reducing the waveform magnitudes prior to using the waveforms to control the drives.

2. The apparatus of claim 1 further including an isolation transformer between the first and second three phase drives and the single three phase load.

3. The apparatus of claim 1 further including a (3★Y)-to-3 phase isolation transformer between the first and second three phase drives and the single three phase load wherein Y is at least two.

4. The apparatus of claim 2 wherein Y is the number of drives in the apparatus.

5. The apparatus of claim 2 further including at least a third three phase drive that includes a third three phase rectifier and a third three phase inverter, the third three phase rectifier linked to a third three of the X phase intermediate lines and to each of the positive and negative DC buses, the third three phase inverter linked to each of the positive and negative DC buses and to the single three phase load to provide voltage to the load, the third rectifier receiving three phase intermediate voltages via the third three intermediate lines and converting the input voltages to DC bus voltage across the buses, the third inverter converting at least a portion of the DC bus voltage to AC voltage and providing the AC voltage to the single three phase load.

6. The apparatus of claim 5 wherein the transformer is a 9-to-3 phase isolation transformer.

7. The apparatus of claim 2 wherein the isolation transformer is one of a parallel primary-series secondary transformer and an isolated multiphase transformer.

8. The apparatus of claim 1 also for converting three phase input voltages on three phase input lines to the X phase intermediate voltages on the X phase intermediate lines, the apparatus further including a 3-to-X phase input transformer between the three phase input lines and the X phase intermediate lines.

9. The apparatus of claim 8 wherein the input transformer includes an autotransformer.

10. The apparatus of claim 8 wherein the input transformer includes an isolated multiphase transformer.

11. The apparatus of claim 8 wherein the input transformer includes an isolated auto multiphase transformer.

12. The apparatus of claim 8 further including a (3★Y)-to-3 phase isolation transformer between the three phase drives and the single three phase load wherein Y is at least two.

13. The apparatus of claim 12 further including at least a third three phase drive that includes a third three phase rectifier and a third three phase inverter, the third three phase rectifier linked to a third three of the X phase intermediate lines and to each of the positive and negative DC buses, the third three phase inverter linked to each of the positive and negative DC buses and to the single three phase load to provide voltage to the load, the third rectifier receiving three phase intermediate voltages via the third three intermediate lines and converting the input voltages to DC bus voltage across the buses, the third inverter converting at least a portion of the DC bus voltage to AC voltage and providing the AC voltage to the single three phase load.

14. The apparatus of claim 13 wherein Y=X/3.

15. The apparatus of claim 1 wherein X is 9.

16. The apparatus of claim 1 further including an isolation transformer linked between at least the first drive and the single three phase load for converting the first drive output voltages to three phase voltages, the transformer including primary windings linked to the first drive and secondary windings linked to the single three phase load, wherein output lines of at least one of the drives are linked through the secondary windings to the single three phase load.

17. The apparatus of claim 16 further including at least a third three phase drive that includes a third three phase rectifier and a third three phase inverter, the third three phase rectifier linked to a third three of the X phase intermediate lines and to each of the positive and negative DC buses, the third three phase inverter linked to each of the positive and negative DC buses and to the single three phase load to provide voltage to the load, the third rectifier receiving three phase intermediate voltages via the third three intermediate lines and converting the input voltages to DC bus voltage across the buses, the third inverter converting at least a portion of the DC bus voltage to AC voltage and providing the AC voltage to the single three phase load, the isolation transformer linked between at least the second drive and the single three phase load for also converting the second drive output voltages to three phase voltages, a subset of the transformer primary windings linked to the second drive and a subset of the transformer secondary windings linked to the single three phase load.

18. The apparatus of claim 1 wherein the controller reduces the waveform magnitudes by dividing each waveform by X/3.

19. The apparatus of claim 1 wherein the controller reduces the waveform magnitudes by different amounts for each of at least a subset of the drives.

20. An apparatus for converting X phase intermediate voltages on X intermediate lines to output voltage for driving a single three phase load, where X is a multiple of three, the apparatus comprising:
    a positive DC bus:
    a negative DC bus;
    a first three phase drive that includes a first three phase rectifier and a first three phase inverter, the first three phase rectifier linked to a first three of the X phase intermediate lines and to each of the positive and negative DC buses, the first three phase inverter linked to each of the positive and negative DC buses and to the single three phase load to provide voltage to the load, the first rectifier receiving three phase intermediate voltages via the first three intermediate lines and converting the intermediate voltages to DC bus voltage across the buses, the first inverter converting at least a portion of the DC bus voltage to AC voltage and providing the AC voltage to the single three phase load; and
    a second three phase drive that includes a second three chase rectifier and a second three phase inverter, the second three phase rectifier linked to a second three of the X phase intermediate lines and to each of the positive and negative DC buses, the second three phase inverter linked to each of the positive and negative DC buses and to the single three phase load to provide voltage to the load, the second rectifier receiving three phase intermediate voltages via the second three intermediate lines and converting the input voltages to DC bus voltage across the buses, the second inverter converting at least a portion of the DC bus voltage to AC voltage and providing the AC voltage to the single three phase load;
    wherein the load has a rated frequency and wherein a controller receives three phase modulating waveforms and uses those waveforms and an output frequency to generate output waveforms for controlling the drives, the controller providing a first set of output waveforms when the output frequency is below the rated frequency and providing a second set of output waveforms when the output frequency is above the rated frequency.

21. The apparatus of claim 20 wherein the first set of output wave forms includes three phase waveforms that are identical to the modulating waveforms and that are provided to the first drive and other waveforms that have zero values that are provided to the other drives and wherein the second set of output wave forms include reduced magnitude waveforms.

22. A method for converting X phase intermediate voltages on X intermediate lines to output voltage for driving a single three phase load where X is a multiple of three, the method for use with positive and negative DC buses and comprising the steps of:
    providing a first three phase drive that includes a first three phase rectifier and a first three phase inverter;
    providing a second three phase drive that includes a second three phase rectifier and a second three phase inverter;
    linking the first three phase rectifier to a first three of the X phase intermediate lines and to each of the positive and negative DC buses;
    linking the first three phase inverter to each of the positive and negative DC buses and to the single three phase load to provide voltage to the load;
    linking the second three phase rectifier to a second three of the X phase intermediate lines and to each of the positive and negative DC buses;
    linking the second three phase inverter to each of the positive and negative DC buses and to the single three phase load to provide voltage to the load
    using the first rectifier to convert three phase intermediate voltages received via the first three intermediate lines to DC bus voltage across the buses;
    using the second rectifier to convert three phase intermediate voltages received via the second three intermediate lines to DC bus voltage across the buses;
    using the first inverter to convert at least a portion of the DC bus voltage to AC voltage;
    using the second inverter to convert at least a portion of the DC bus voltage to AC voltage;
    providing the AC voltage to the single three phase load; and
    providing a controller that receives three phase modulating waveforms and uses those waveforms to drive the drives, the controller reducing the waveform magnitudes prior to using the waveforms to control the drives.

23. The method of claim 22 further including providing an isolation transformer between the first and second three phase drives and the single three phase load.

24. The method of claim 23 wherein the isolation transformer is one of a parallel primary-series secondary transformer and an isolated multiphase transformer.

25. The method of claim 22 also for converting three phase input voltages on three phase input lines to the X phase intermediate voltages on the X phase intermediate lines, the method further including providing a 3-to-X phase input transformer between the three phase input lines and the X phase intermediate lines wherein the input transformer includes one of an autotransformer and an isolated multiphase transformer.

26. The method of claim 22 further including the step of providing an isolation transformer linked between at least the first drive and the single three phase load for converting the first drive output voltages to three phase voltages, the transformer including primary windings linked to the first drive and secondary windings linked to the single three phase load, wherein output lines of at least one of the drives are linked through the secondary windings to the single three phase load.

27. The method of claim 1 also for use with a controller for controlling the drives, the method further including the steps of providing three phase modulating waveforms to the controller and reducing the waveform magnitudes prior to using the waveforms to control the drives.

28. The method of claim 22 also for use with a controller for controlling the drives and wherein the load has a rated frequency, the method further including the steps of providing three phase modulating waveforms to the controller and using those waveforms and an output frequency to generate a first set of output waveforms when the output frequency is below the rated frequency and to generate a second set of output waveforms when the output frequency is above the rated frequency where the output waveforms are used to control the drives.

29. The method of claim 28 wherein the step of generating a first set of output waveforms includes generating a first set of output wave forms including three phase waveforms that are identical to the modulating waveforms and that are provided to the first drive and other waveforms that have zero values that are provided to the other drives and the step of generating a second set of output waveforms includes generating a second set including reduced magnitude waveforms.

30. An apparatus for converting three phase input voltages on three phase input lines to the to output voltage for driving a single three phase load, the apparatus comprising:
a 3-to-X phase input transformer linked to the three phase input lines and transforming the three phase input voltages to X phase intermediate voltages on X intermediate lines where X is a multiple of three;
a positive DC bus;
a negative DC bus;
a first three phase drive that includes a first three phase rectifier and a first three phase inverter, the first three phase rectifier linked to a first three of the X intermediate lines and to each of the positive and negative DC buses, the first three phase inverter linked to each of the positive and negative DC buses and to the single three phase load to provide voltage to the load, the first rectifier receiving three phase intermediate voltages via the first three intermediate lines and converting the intermediate voltages to DC bus voltage across the buses, the first inverter converting at least a portion of the DC bus voltage to AC voltage and providing the AC voltage to the single three phase load;
a second three phase drive that includes a second three phase rectifier and a second three phase inverter, the second three phase rectifier linked to a second three of the X phase intermediate lines and to each of the positive and negative DC buses, the second three phase inverter linked to each of the positive and negative DC buses and to the single three phase load to provide voltage to the load, the second rectifier receiving three phase intermediate voltages via the second three intermediate lines and converting the input voltages to DC bus voltage across the buses, the second inverter converting at least a portion of the DC bus voltage to AC voltage and providing the AC voltage to the single three phase load; and
an isolation transformer linked between the three phase drives and the single three phase load
wherein a controller receives three phase modulating waveforms and uses those waveforms to drive the drives, the controller reducing the waveform magnitudes prior to using the waveforms to control the drives.

31. The apparatus of claim 30 wherein the input transformer is one of an isolated autotransformer, a non-isolated autotransformer and an isolated 3-to-X phase transformer.

* * * * *

UNITED STATES PATENT AND TRADEMARK OFFICE
CERTIFICATE OF CORRECTION

| | |
|---|---|
| PATENT NO. | : 7,535,738 B2 |
| APPLICATION NO. | : 11/508535 |
| DATED | : May 19, 2009 |
| INVENTOR(S) | : Lixiang Wei et al. |

It is certified that error appears in the above-identified patent and that said Letters Patent is hereby corrected as shown below:

Claim 20, Column 14, line 2, "chase" should be --phase--.

Signed and Sealed this

Twenty-fifth Day of August, 2009

David J. Kappos
*Director of the United States Patent and Trademark Office*